Dec. 29, 1931. J. H. McPARTLAND 1,839,042

BALL COCK VALVE

Filed Jan. 27, 1931

WITNESSES
Edw. Thorpe
A. L. Kitchin

INVENTOR
James H. McPartland
BY
Munn & Co.
ATTORNEY

Patented Dec. 29, 1931

1,839,042

UNITED STATES PATENT OFFICE

JAMES H. McPARTLAND, OF HOULTON, MAINE

BALL-COCK VALVE

Application filed January 27, 1931. Serial No. 511,604.

This invention relates to a ball-cock valve and has for an object to provide an improvement over my prior Patent No. 608,897. Another object of the invention is to provide an improved ball-cock valve wherein the parts may be adjusted to produce different fulcrum effects between the ball and the valve to take care of different water pressures. Another object is to provide a ball-cock valve wherein the valve mechanism includes a sleeve slidably mounted on spirally positioned webs whereby an ample space is provided for the flow of the water, and yet the whirling movement given by the webs will prevent appreciable noise.

An additional object, more specifically, is to provide a ball-cock valve wherein the valve seat is removable and reversible and also wherein the valve member coacting with the seat is adjustable toward and from the seat.

In the accompanying drawings—

Figure 2:
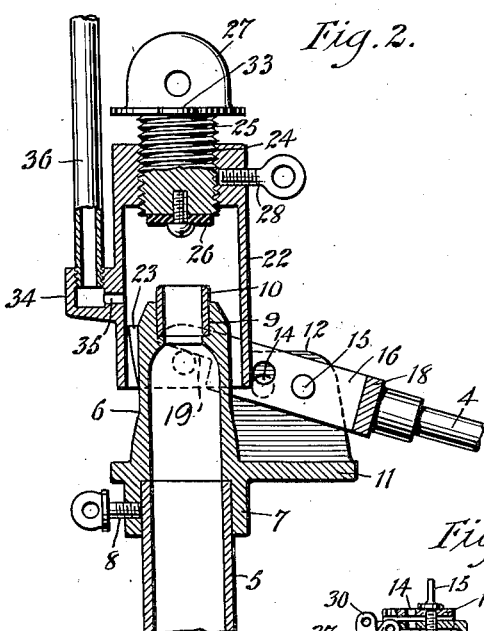
Figure 2 is a longitudinal vertical sectional view through the valve mechanism shown in Figure 1, the same being on an enlarged scale.

Referring to the accompanying drawings by numerals, 1 indicates a tank of any desired kind, and 2 the valve mechanism which is adapted to be actuated by the flow of water, and the ball 3 acting through the rod 4 and connected parts. The valve mechanism 2 is mounted on a tube or pipe 5 which may be clamped in place in the tank 1 by suitable nuts, the detailed structure of which forms no part of the present invention. As shown in Figure 2, the valve mechanism has a tube 6 provided with a depending annular flange 7, telescopically fitting over the upper end of pipe 5 and locked to pipe 5 by suitable set screw 8. The tube 6 is provided with a valve seat socket 9 adapted to receive the tubular valve seat 10, which valve seat has a seating surface at each end. The valve seat 10 projects a short distance above the socket in which it is fitted and whenever the seating surface thereof is worn, the valve seat may be removed and reversed so that the opposite seating surface may be used. When both ends of the valve seat have become worn, the valve seat must be replaced to secure the best results. The tubular member 6 is provided with a horizontally extending plate 11 having upstanding ears 12 and 13, which ears are provided with a plurality of apertures 14 in which the respective fulcrum pins 15 are mounted. It will be noted from Figure 4 that there are 2 fulcrum pins and they are always arranged in alinement so as to occupy one of the apertures 14 in each ear and one of the apertures in each of the prongs 16 and 17 of the fork 18, which fork is rigidly secured to the rod 4. The respective tines 16 and 17 are each provided with a notch 19 whereby actuating fingers 20 are provided and positioned to engage the respective pins 21 extending from opposite sides of the sleeve 22. It will be noted that the fork 18 fits between the ears 12 and 13 and partly straddles the sleeve 22.

Figure 1:
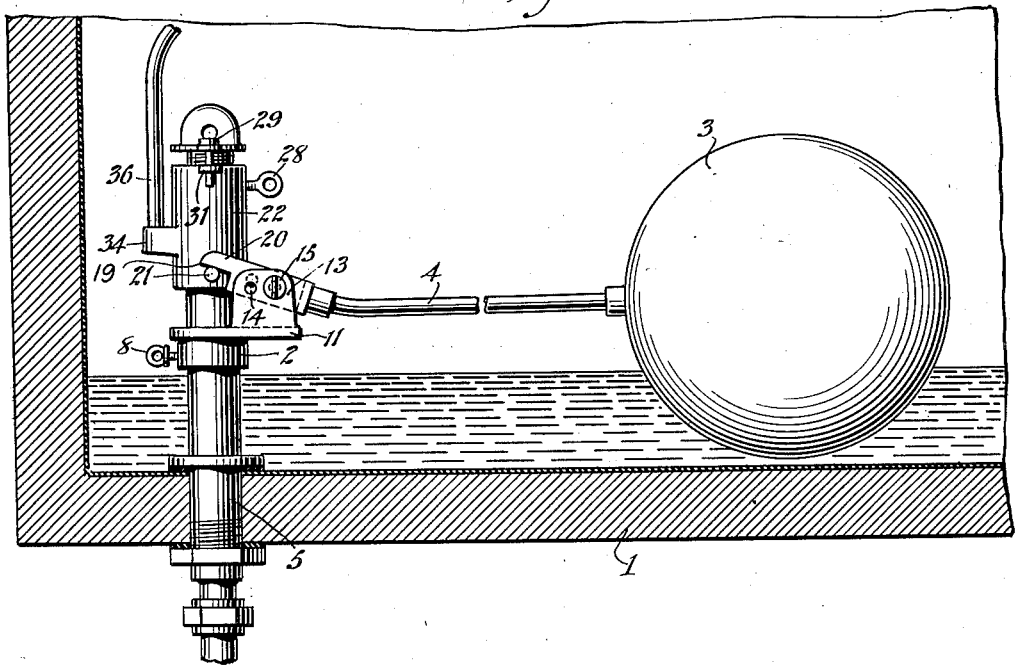
Figure 1 is a fragmentary sectional view through a tank disclosing a ball-cock valve embodying the invention applied thereto, the valve and ball being shown in elevation.
Figure 3:
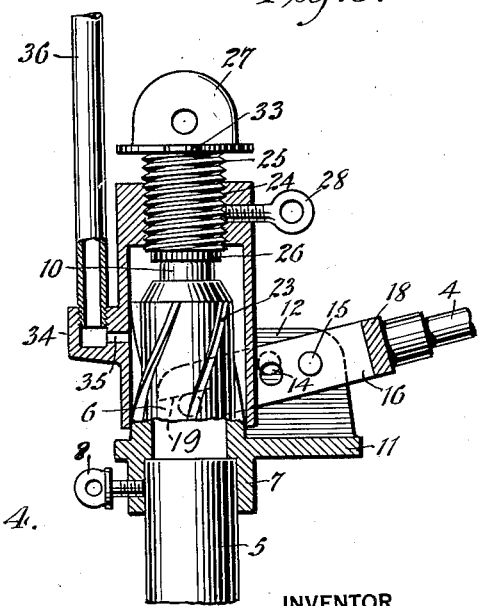
Figure 3 is a view similar to Figure 2, but showing the parts in a closed position.
Figure 4:
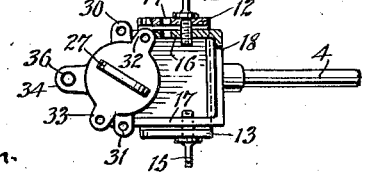
Figure 4 is a top plan view of the valve mechanism shown in Figure 1, certain parts being broken away for better illustrating the adjustability of the fulcrum pin.

When the water pressure is a certain number of pounds the fulcrum pins 15 may be arranged as shown in Figure 4. If the water pressure should increase to a great extent, the pins 15 could be removed from the location shown in Figure 4 and shifted to the next set of apertures 14 next adjacent the sleeve 22. This would increase the leverage action and consequently permit the ball 3 to properly close the valve structure at the proper time. As illustrated in Figures 2 and 3, the sleeve 22 telescopes over the tube 6 and loosely engages the various spiral webs 23. By reason of this structure, there is ample space for the flow of water and the water is deflected in its downward movement so that the noise of the flow of water will be reduced. The upper part of the sleeve 22 is made with a thickened portion 24 which is internally threaded for receiving the valve member 25. This valve member has a washer 26 connected thereto at the bottom, which washer is adapted to be brought into contact with the valve seat 10 as shown in Figure 3 when the valve is closed. By reason of the threaded nature of the valve member 25, said valve member may be adjusted vertically or toward and from the seat 10. The apertured ear 27 is formed as an integral extension of the valve member 25 whereby the valve member 25 may be easily rotated when not locked by the set screw 28 or by the pin 29. It will be noted from Figures 1 and 4 that the sleeve 22 is provided with apertured ears 30 and 31 adapted to coact with apertured ears 32 and 33 extending from the valve member 25 whereby when these ears are alined, one or two pins 29 may be used to prevent accidental rotation of the valve member. The sleeve 22 is also provided with a hollow enlargement 34 communicating with the interior of the sleeve through passageway 35 whereby the usual refill tube 36 may be connected with the sleeve 22 and a supply of water for refilling the bowl during the refilling of the tank. It will be observed from Figure 3 that this refill tube is deprived of water when the valve is closed.

It will be understood that the water pressure is adapted to open the valve while the action of the ball 3 and associate parts perform the function of closing the valve against the water pressure.

I claim:

A ball-cock valve comprising a fluid conveying tubular member, means acting as a valve plug for closing the tubular member when in one position, a fork operatively connected with said means, a pair of stationary ears having a plurality of apertures extending in a line away from said tubular member, said fork having a plurality of apertures spaced the same distance apart as the first mentioned apertures, a pair of pins for connecting the respective tines of said fork to said ears through certain of said apertures, said pins being adapted to be moved from one of said apertures to vary the fulcrum point, and float actuated member connected with said fork for actuating the same.

JAMES HUGH McPARTLAND.